US012726854B2

(12) United States Patent
Watts et al.

(10) Patent No.: US 12,726,854 B2
(45) Date of Patent: Sep. 1, 2026

(54) SYSTEMS AND METHODS FOR CORE NETWORK BYPASS IN A WIRELESS NETWORK

(71) Applicant: Verizon Patent and Licensing Inc., Basking Ridge, NJ (US)

(72) Inventors: Mark T. Watts, Newport, RI (US); David Taft, Keller, TX (US); Donna L. Polehn, Mercer Island, WA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 31 days.

(21) Appl. No.: 18/615,339

(22) Filed: Mar. 25, 2024

(65) Prior Publication Data

US 2025/0301369 A1 Sep. 25, 2025

(51) Int. Cl.
*H04W 28/08* (2023.01)
*H04L 45/00* (2022.01)
*H04L 45/44* (2022.01)

(52) U.S. Cl.
CPC ......... *H04W 28/0875* (2020.05); *H04L 45/22* (2013.01); *H04L 45/44* (2013.01); *H04W 28/0925* (2020.05)

(58) Field of Classification Search
CPC .......... H04W 28/0875; H04W 28/0925; H04L 45/22; H04L 45/44
See application file for complete search history.

(56) References Cited

U.S. PATENT DOCUMENTS

2011/0235595 A1* 9/2011 Mehta ..................... H04L 45/22 370/329
2013/0326631 A1* 12/2013 Cartmell ............... H04W 12/80 726/26
2015/0295833 A1* 10/2015 Mizukoshi ............ H04L 45/306 370/235

FOREIGN PATENT DOCUMENTS

CN 114641038 A * 6/2022 ........ H04W 28/0835
WO WO-2025108820 A1 * 5/2025

OTHER PUBLICATIONS

M. O. I. Musa, T. E. H. El-Gorashi and J. M. H. Elmirghani, "Network coding for energy efficiency in bypass IP/WDM networks," 2016 18th International Conference on Transparent Optical Networks (ICTON), Trento, Italy, 2016, pp. 1-3 (Year: 2016).*
S. Pachnicke, H. Kagba and p. M. Krummrich, "Load Adaptive Optical-Bypassing for Reducing Core Network Energy Consumption," Photonic Networks, 12 . ITG Symposium, Leipzig, Germany, 2011, pp. 1-5. (Year: 2011).*

* cited by examiner

*Primary Examiner* — Messeret F Gebre

(57) ABSTRACT

A system described herein may receive an indication that a particular User Equipment ("UE") has wirelessly connected to a radio access network ("RAN") of a wireless network. The RAN may be communicatively coupled to a core network of the wireless network. The system may identify that a core bypass policy is associated with the particular UE, and may instruct the RAN to bypass the core network when routing traffic associated with the particular UE. Based on the instruction to bypass the core network, the RAN may route traffic, received from the particular UE, to a Data Network ("DN") without routing the traffic to the core network.

20 Claims, 10 Drawing Sheets

SYSTEMS AND METHODS FOR CORE NETWORK BYPASS IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may include a radio access network ("RAN"), which provides a wireless interface to the UEs. Wireless networks may also include a core network, which provides continuity of communication sessions associated with such UEs, such as in mobility scenarios (e.g., when a UE moves from one geographical location to another). Some UEs, such as Fixed Wireless Access ("FWA") devices, are not typically mobile due to the nature of their deployment. For example, FWA devices may be permanently or semi-permanently installed at offices, residences, facilities, etc. FWA devices may connect to a RAN of a wireless network, and may provide network connectivity (e.g., wired or wireless connectivity) to other devices that are located at such locations, such as desktop computers, IoT devices, smart appliances, or the like.

DETAILED DESCRIPTION OF EXAMPLE EMBODIMENTS

The following detailed description refers to the accompanying drawings. The same reference numbers in different drawings may identify the same or similar elements.

Embodiments described herein provide for a selective bypass of a core network when providing network connectivity to one or more UEs. As discussed herein, scenarios may exist in which a given UE may not need the session continuity features provided by a core network, such as when a UE is or includes a FWA device or other particular type of device, when the UE is permanently installed at a given location, when the UE is stationary at a given location for at least a threshold duration of time, etc. In this manner, resources of the core network may be conserved and selectively used for UEs that need (or may potentially need) to make use of the continuity features of the core network, such as UEs that move from one geographical area to another, thus enhancing the overall efficiency of the network. Further, since such techniques bypass the core network for UEs that would not make use of the continuity features of the core network, impacts to the network performance and user experience for such UEs may be minimal or zero.

Figure 1:
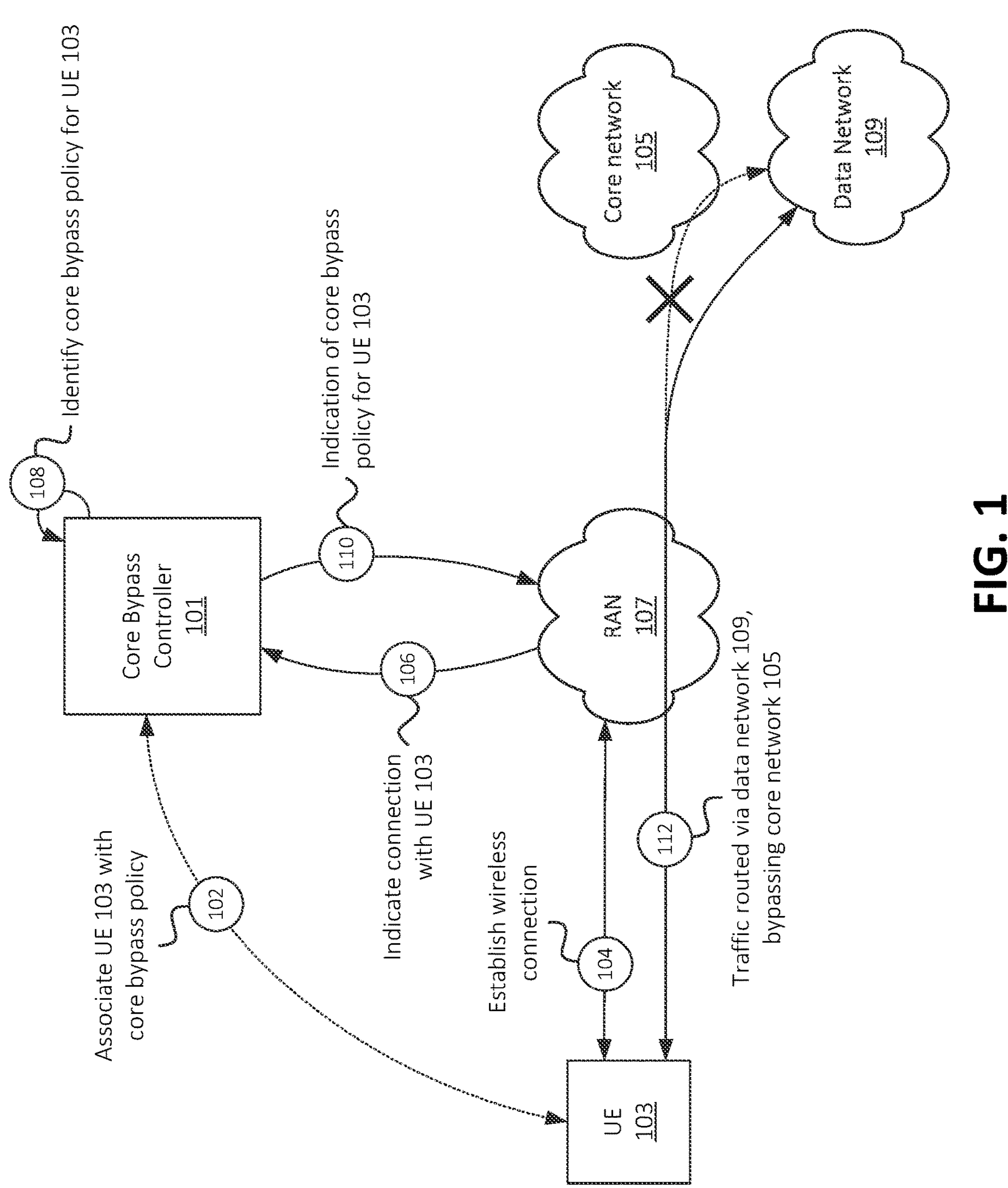
FIG. 1 illustrates an example overview of one or more embodiments described herein.

FIG. 1 illustrates an example overview of embodiments described herein. As shown, Core Bypass Controller ("CBC") 101 may receive (at 102) information associating one or more UEs, such as a particular UE 103, with one or more core bypass policies. In some embodiments, CBC 101 may receive one or more identifiers of UE 103, such as a Mobile Directory Number ("MDN"), an International Mobile Subscriber Identity ("IMSI") value, an International Mobile Station Equipment Identity ("IMEI") value, a Subscription Permanent Identifier ("SUPI"), a Globally Unique Temporary Identifier ("GUTI"), and/or other one or more other suitable identifiers based on which UE 103 may be uniquely identified.

In some embodiments, the association (at 102) of UE 103 with the core bypass policy may be performed as part of a registration procedure or other suitable procedure in which UE 103 communicates with CBC 101 (e.g., via an application programming interface ("API") or some other suitable communication pathway). In some embodiments, the association (at 102) of UE 103 may be performed as part of a provisioning or configuration procedure. For example, CBC 101 may be associated with one or more APIs, web portals, interfaces, etc. via which CBC 101 may receive UE identifiers (e.g., as discussed above) and/or other attributes (e.g., device type, location, temporal conditions such as time of day or day of week, etc.) based on which CBC 101 may identify that UE 103 is associated with a core bypass policy. As discussed herein, the core bypass policy may be a policy whereby CBC 101 determines whether communications associated with UE 103 should or should not bypass core network 105.

In some embodiments, CBC 101 may receive one or more core bypass policies, indicating particular UEs (e.g., may specify one or more UE identifiers such as SUPI, GUTI, MDN, etc.), particular UE categories or groups (e.g., "first responder," "enterprise," etc.), temporal conditions (e.g., time of day, day of week, etc.), traffic or service types (e.g., voice, data, content streaming, etc.), and/or other suitable criteria, conditions, or parameters. CBC 101 may receive the core bypass policies from an owner or administrator of core network 105 and/or RAN 107 (e.g., via a management console associated with CBC 101, via a web portal, via an API, etc.). Additionally, or alternatively, CBC 101 may receive the core bypass policies from one or more elements of core network 105, such as a Policy Control Function ("PCF"), a Policy Charging and Rules Function ("PCRF"), etc. In some embodiments, CBC 101 may receive the core bypass policies via a Network Exposure Function ("NEF"), Service Capability Exposure Function ("SCEF"), or other suitable device or system that facilitates communications between elements of core network 105 and external devices, such as CBC 101.

In one example, and as referred to above, UE 103 may be a FWA device that connects (e.g., at 104) to RAN 107, which may be communicatively coupled to core network 105 (e.g., via one or more routers, backhaul links, etc.). RAN 107 may include base stations or other wireless network infrastructure equipment that provides wireless connectivity to UEs as such UEs move to different locations that are served by such base stations or other wireless network infrastructure equipment. As UEs move to different locations (e.g., served by different base stations), core network 105 may maintain end-to-end communication continuity, such that other networks (e.g., data network ("DN") 109, which may include or may be communicatively coupled to the Internet) or devices that communicate with such UEs may not need to re-establish communications (e.g., Internet Protocol ("IP") sessions) with the UEs as the UEs move to different geographical locations (e.g., obtain wireless connectivity from different base stations of RAN 107).

In other examples, UE 103 may be or may include some other type of device, other than an FWA device. RAN 107 may indicate (at 106), to CBC 101, the connection of UE 103 to RAN 107. For example, a particular base station of RAN 107, to which UE 103 has connected, may output one or more messages to CBC 101 (e.g., via an E2 interface, an O1 interface, or some other suitable interface, communication pathway, or API). Additionally, or alternatively, CBC 101 may receive the notification from some other suitable device or system, such as a RAN controller, an Access and Mobility Management Function ("AMF"), a Mobility Management Entity ("MME"), and/or some other suitable device or system. In some embodiments, CBC 101 may receive the indication via a NEF, SCEF, etc., which may be communicatively coupled to an AMF, an MME, or some other suitable device or system. In some embodiments, the indication may include one or more identifiers of UE 103, such as a SUPI, a GUTI, an MDN, or the like. In some embodiments, the indication may include other information in addition to, or in lieu of, an identifier of UE 103. For example, the indication may include a requested traffic or service type, an indication of one or more network slices, a device type of UE 103 (e.g., FWA device or other type of device), a category or classification of UE 103, and/or other suitable information.

CBC 101 may further identify that UE 103 is associated with a core bypass policy. For example, CBC 101 may compare the identifier of UE 103 (and/or other attributes, parameters, etc. discussed above) to one or more core bypass policies (e.g., where such core bypass policies specify such attributes as conditions for which such core bypass policies apply), and may determine that a core bypass policy applies for UE 103 in this example. In general, such core bypass policies may be applicable for UEs that are not expected to utilize the mobility features of core network 105, such as FWA devices.

As another example, UEs that are not expected to utilize the mobility features of core network 105 may be UEs that are identified, using artificial intelligence/machine learning ("AI/ML") techniques or other suitable predictive and/or modeling techniques, as not being expected to utilize the mobility features of core network 105. For example, CBC 101 may identify (e.g., based on historical information associated with UE 103 movements) that UE 103 is a mobile telephone that, once connected to a particular base station of RAN 107, does not tend to move to the service area of another base station of RAN 107. As another example, CBC 101 may identify that one or more temporal conditions are met when UE 103 connects to RAN 107 (e.g., UE 103 connects to RAN 107 at a particular time of day, day of week, etc. associated with one or more core bypass policies).

In some embodiments, CBC 101 may receive metrics, Key Performance Indicators ("KPIs"), etc. associated with core network 105, such as load metrics. In some embodiments, CBC 101 may receive an indication that core network 105 is overloaded (e.g., one or more measures of load exceed one or more thresholds indicated by a core bypass policy), and may identify (at 108) that traffic associated with UE 103 should bypass core network 105 due to core network 105 being overloaded. In this manner, one or more factors in addition to, or in lieu of, parameters or characteristics of UE 103 may be used to identify that UE 103 is associated with a core bypass policy.

CBC 101 may indicate (at 110), to RAN 107 (e.g., to one or more base stations of RAN 107, to a RAN controller, one or more routers, etc.), that UE 103 is associated with a core bypass policy. Based on receiving such indication, and as further discussed below, RAN 107 may route (at 112) traffic, associated with UE 103, to and from DN 109. In other words, RAN 107 may forgo routing such traffic to core network 105 (which in turn would route such traffic to DN 109), as the mobility features of core network 105 may be unnecessary for UE 103 (e.g., UE 103 may be an FWA device, a stationary device, and/or may otherwise have been identified as not requiring the mobility features of core network 105). As discussed below, routing (at 112) the traffic to DN 109 may include selecting one or more routing paths that include one or more routing devices that are communicatively coupled to DN 109 (e.g., are communicatively coupled to a gateway, a router, a hub, etc. of DN 109) and/or to a destination of the traffic (e.g., an application server, another UE, etc.). Additionally, or alternatively, routing the traffic to DN 109 may include selecting one or more routing paths that exclude core network 105 (e.g., do not include routing devices, gateways, etc. that are included in core network 105).

Figure 2:
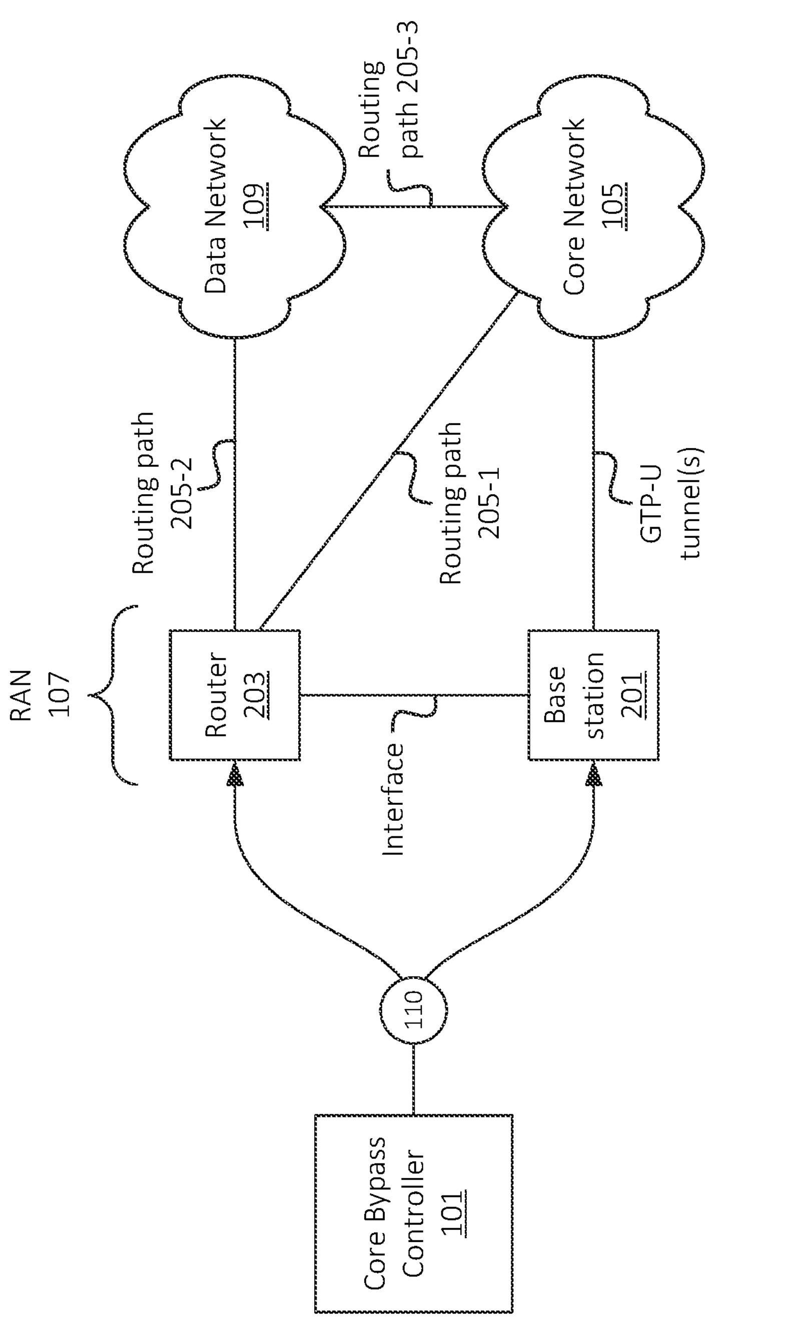
FIG. 2 illustrates an example of communication that may be interfaces used in one or more embodiments described herein.

As shown in FIG. 2, when indicating (at 110) the core bypass policies to RAN 107, CBC 101 may provide core bypass policy information to base station 201 and one or more routers 203 of RAN 107. When routing traffic to core network 105 (e.g., when not bypassing core network 105), base station 201 may establish and utilize one or more tunnels, such as General Packet Radio Service ("GPRS") Tunneling Protocol ("GTP")-U tunnels. In a mobility scenario for a given UE, a core network endpoint of a given GTP-U tunnel may remain the same (e.g., a particular User Plane Function ("UPF"), a particular Packet Data Network ("PDN") Gateway ("PGW"), etc.), but a RAN endpoint of the GTP-U tunnel may change (e.g., from base station 201 to another base station), thus allowing for communication continuity of the UE as the UE connects to different base stations. Although shown as a "direct" connection between base station 201 and core network 105 in FIG. 2 for the purposes of explanation, in practice, one or more GTP-U tunnels may traverse, may be routed by, etc. router 203 and/or one or more other routing devices.

FIG. 2 illustrates three example routing paths 205-1, 205-2, and 205-3. Each routing path 205 may include and/or may represent one or more network devices (e.g., routers, hubs, switches, gateways, etc.) as well as one or more transmission links between such network devices (e.g., cables, fibers, etc.). Although shown as separate paths, one or more of the illustrated routing paths 205 may include one or more of the same network devices. For example, routing paths 205-1 and 205-2 may include one or more of the same network devices, and/or may include one or more different network devices. Further, multiple routing paths 205 may be available between router 203 and DN 109, and/or multiple routing paths 205 may be available between router 203 and core network 105.

Figure 3:
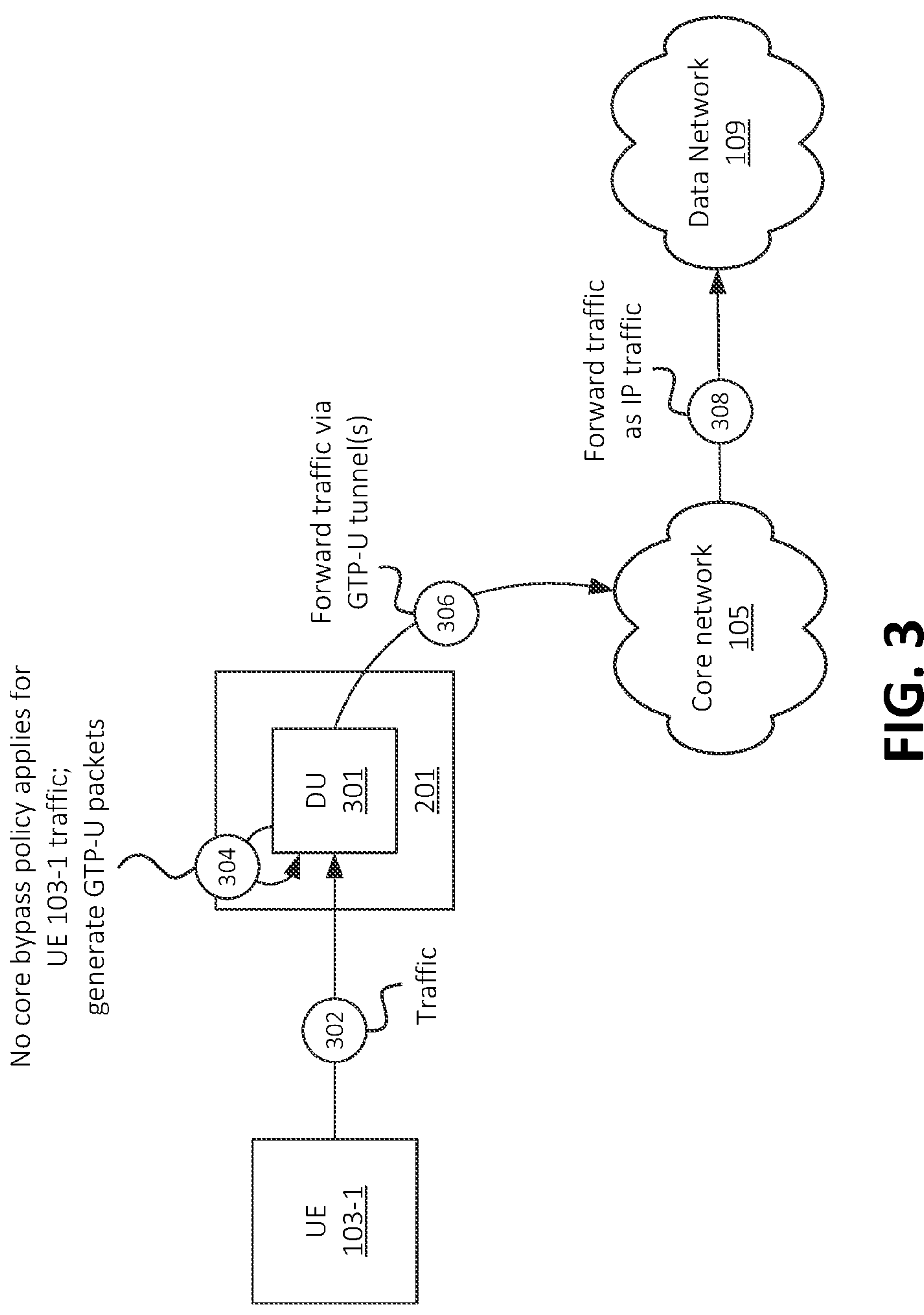
FIGS. 3 and 4 illustrate examples of selectively bypassing a core network, in accordance with some embodiments.

As shown in FIG. 3, assume that base station 201 receives (at 302) traffic from a particular UE 103-1, and that a core bypass policy does not apply to such traffic. Base station 201 may have received such traffic via one or more radios, antennas, etc., which may be included in a radio unit ("RU") or other element of base station 201. One or more baseband processing elements of base station 201, such as Distributed Unit ("DU") 301, may identify (at 304) that no core bypass policy applies for the traffic received from UE 103-1. For example, DU 301 may identify that a UE identifier of UE 103-1 does not match one or more core bypass policies and/or that the traffic otherwise does not satisfy criteria, conditions, etc. associated with such core bypass policies.

For example, as discussed above, CBC 101 may receive (e.g., at 106) an indication of a connection between UE 103-1 and RAN 107 (and/or the occurrence of some other suitable event or triggering condition), and may determine whether a core bypass policy applies for UE 103-1 based on the indication. CBC 101 may indicate, to DU 301, whether to bypass core network 105 based on the determination of whether a core bypass policy applies for UE 103-1. For example, CBC 101 may provide an identifier of UE 103-1 (e.g., SUPI, GUTI, etc.) to DU 301, with an indication that traffic associated with such identifier should be routed to core network 105 (e.g., should be routed to core network 105 or some other device or system that is communicatively coupled to core network 105). Additionally, or alternatively, CBC 101 may forgo providing any instruction or indication associated with UE 103-1 (e.g., may not provide a core bypass instruction) to DU 301. DU 301 may accordingly forward (at 306) the traffic to core network 105 (e.g., based on receiving an instruction not to bypass core network 105 for traffic associated with UE 103-1, and/or based on not receiving an instruction to bypass core network 105 for traffic associated with UE 103-1).

In some embodiments, forwarding the traffic to core network 105 may include providing the traffic (e.g., Radio Link Control ("RLC") traffic) to a device or system that performs higher layer processing (e.g., Packet Data Convergence Protocol ("PDCP") processing, Service Data Application Protocol ("SDAP") processing, etc.) on the traffic, which may include generating IP traffic based on the traffic received from UE 103-1. In some embodiments, such device may be or may include a Central Unit ("CU"), where multiple DUs may be communicatively coupled to the same CU, as discussed below. Forwarding the traffic (e.g., the IP traffic) may include forwarding the traffic via one or more GTP-U tunnels between base station 201 (e.g., a CU of base station 201) and one or more elements of core network 105 (e.g., a UPF, a PGW, etc.).

In some embodiments, base station 201 may output the traffic (e.g., IP traffic) to router 203, which may route, forward, etc. (at 306) the traffic to core network 105 (e.g., via routing path 205-1). For example, router 203 may implement a segment routing mechanism or some other suitable mechanism whereby router 203 may be able to specify a particular path for outbound traffic (e.g., may be able to specify routing path 205-1 or routing path 205-2). In this example, router 203 may identify that the traffic is not associated with a core bypass policy, such as by identifying that an identifier of UE 103-1 does not match one or more UE identifiers associated with one or more core bypass policies maintained by router 203. Additionally, or alternatively, router 203 may identify that one or more other attributes of the traffic are not associated with a core bypass policy. Core network 105 may proceed to forward (at 308) the traffic to DN 109 (e.g., via routing path 205-3). In some embodiments, core network 105 may forward the traffic as IP traffic, such that DN 109 may route the traffic toward its ultimate destination (e.g., an application server, another UE, etc.).

When bypassing core network 105 for traffic associated with one or more UEs (e.g., based on a core bypass policy associated with such UEs), base station 201 (e.g., DU 301, a CU, etc.) may provide such traffic to router 203 without performing one or more of the operations described above, such as generating IP packets based on the traffic and forwarding the IP packets to core network 105 via a GTP-U tunnel (e.g., IP packets with base station 201 as an endpoint of the GTP-U tunnel). As discussed above, router 203 may include a segment router or other type of router that is capable of designating or specifying a particular network path (or path selection policies) for traffic forwarded by router 203. In some embodiments, base station 201 may forward first traffic via a first router 203 when determining that the first traffic is associated with a core bypass policy, and may forward second traffic via a second router 203 when determining that the first traffic is not associated with a core bypass policy. For example, the second router 203 may have connectivity with core network 105, while the first router 203 may not have connectivity with core network 105.

Figure 4:
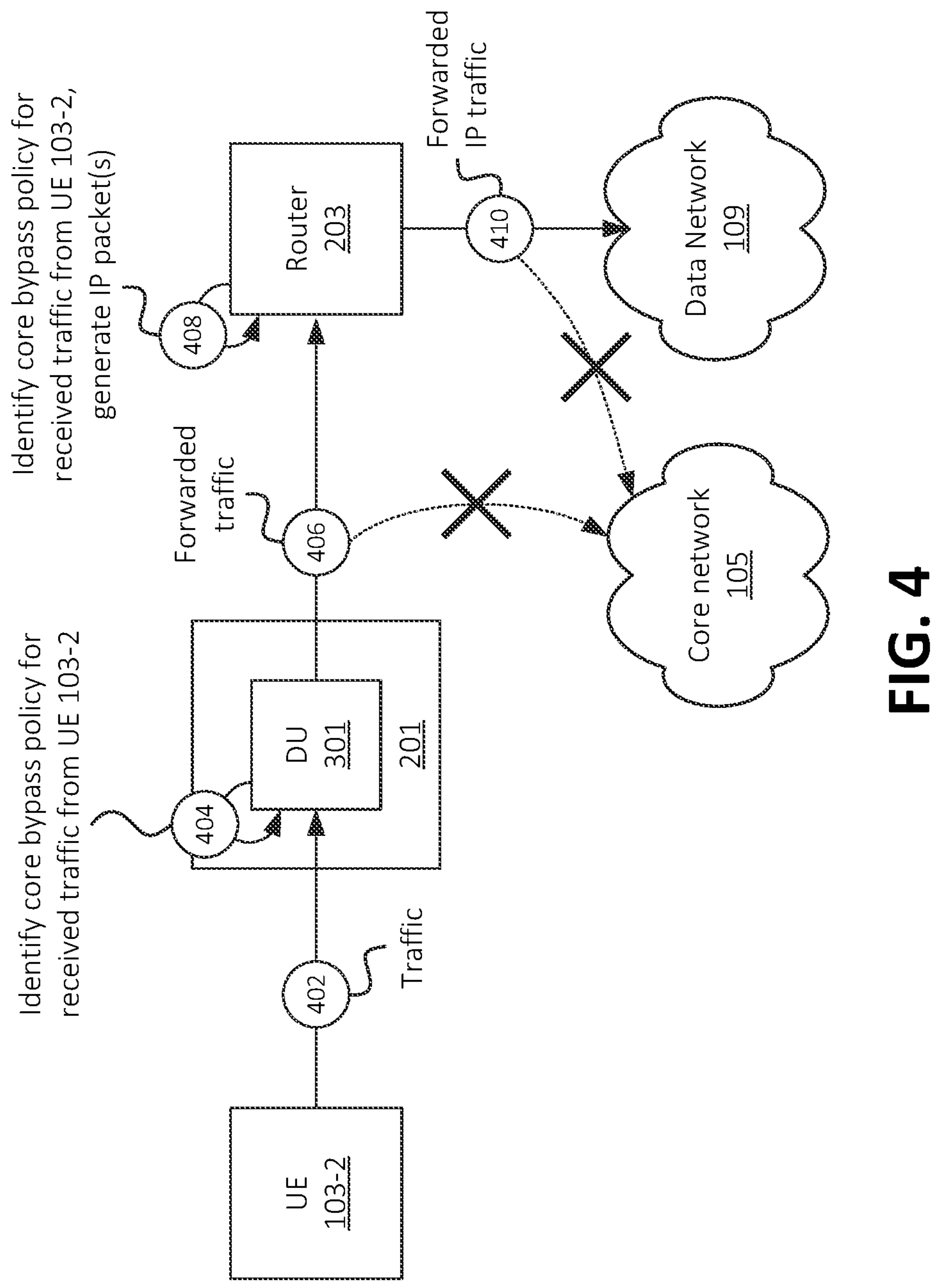

As shown in FIG. 4, base station 201 may receive (at 402) traffic from UE 103-2. For example, DU 301 may receive the traffic via an RU of base station 201. In this example, assume that the traffic associated with UE 103-2 meets one or more criteria or conditions associated with a particular core bypass policy. DU 301 may identify (at 404) that the particular core bypass policy applies to the traffic (e.g., based on an identifier of UE 103-2 such as a SUPI, a device type of UE 103-2, and/or other suitable criteria or conditions). DU 301 may provide, forward, route, output, etc. (at 406) the traffic to router 203. The traffic may include an identifier of UE 103-2, such as a SUPI, a GUTI, etc. Router 203 may identify (at 408) that a core bypass policy applies for the traffic received from UE 103-2. For example, router 203 may identify that the identifier of UE 103-2 matches a UE identifier specified by the core bypass policy.

In some embodiments, router 203 may maintain a mapping, an association, etc. between the identifier of UE (e.g., SUPI, GUTI, etc.) and a routing identifier (e.g., an IP address) used by router 203 when sending or receiving IP traffic. For example, router 203 may perform Dynamic Host Configuration Protocol ("DHCP") techniques or other suitable techniques to assign, select, etc. the IP address for UE 103-2, in order to distinguish traffic associated with UE 103-2 from traffic associated with other devices or systems. Router 203 may generate (at 408) one or more IP packets based on the traffic received from DU 301, and may forward (at 410) the IP traffic to DN 109, which may route the traffic toward its ultimate destination. As discussed above, forwarding (at 410) the IP traffic to DN 109 may include specifying one or more paths, routes, etc. (e.g., routing path 205-2) by router 203. The one or more paths may exclude core network 105 (e.g., forwarding (at 410) the IP traffic to DN 109 may include selecting one or more routing paths that do not include a gateway, router, etc. of core network 105). For example, forwarding the IP traffic to DN 109 may include bypassing core network 105, forgoing routing the traffic to or via core network 105, etc.

Further, in this manner, router 203 may be able to route inbound traffic (e.g., traffic from DN 109 for UE 103-2) to UE 103-2 when such inbound traffic includes the IP address associated with UE 103-2. For example, router 203 may receive IP traffic from DN 109, which includes the IP address associated with UE 103-2, and may identify a SUPI, GUTI, or other UE identifier used by base station 201 to output wireless traffic to UE 103-2. Router 203 may forward the traffic to base station 201 (e.g., DU 301), and base station 201 (e.g., DU 301 via one or more RUs) may wirelessly transmit the traffic to UE 103-2 based on the provided UE identifier of UE 103-2. As such, resources of core network 105 may be conserved and load may be reduced, thus enhancing the efficiency of core network 105, while providing little to no degradation of service for UE 103-2 (e.g., since UE 103-2 has been selected based on not requiring the features of core network 105, such as mobility features).

Figure 5:
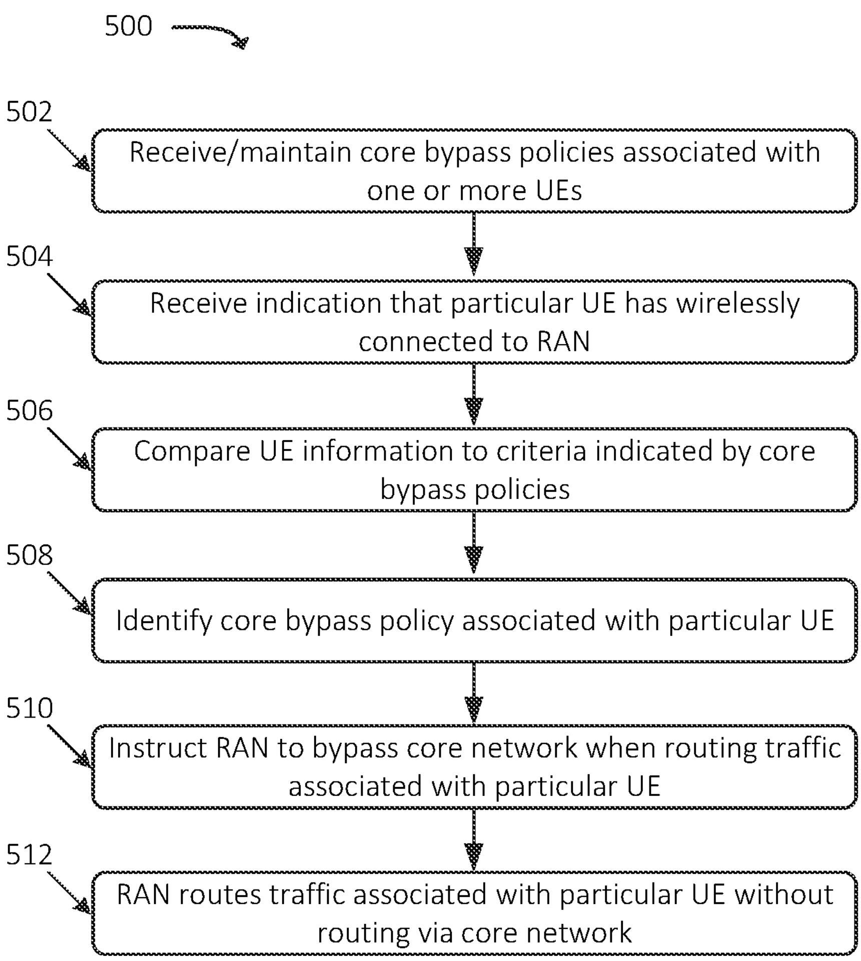
FIG. 5 illustrates an example process for selectively bypassing a core network, in accordance with some embodiments.

FIG. 5 illustrates an example process 500 for bypassing core network 105. In some embodiments, some or all of process 500 may be performed by CBC 101. In some embodiments, one or more other devices may perform some or all of process 500 in concert with, and/or in lieu of, CBC 101.

As shown, process 500 may include receiving and/or maintaining (at 502) one or more core bypass policies associated with one or more UEs 103. For example, as discussed above, CBC 101 may receive or maintain one or more core bypass policies, which indicate particular UEs 103, groups of UEs 103, and/or other criteria for which traffic should bypass core network 105 (e.g., should not be routed via core network 105). As discussed above, such core bypass policies may be specified for UEs 103 that are not expected to move or otherwise utilize the mobility features of core network 105. Such UEs 103 may include, in some embodiments, FWA devices. In some embodiments, CBC 101 may utilize one or more AI/ML techniques or other suitable automated techniques to generate or refine the core bypass policies.

Process 500 may further include receiving (at 504) an indication that a particular UE 103 has wirelessly connected to RAN 107. For example, CBC 101 may receive such indication from a particular base station 201 of RAN 107, an AMF, an MME, a NEF, a SCEF, and/or some other suitable device or system. The indication may include an identifier of UE 103, device type or other attributes of UE 103 QOS information associated with UE 103, and/or other suitable information.

Process 500 may include comparing (at 506) information associated with UE 103 to criteria indicated by core bypass policies. For example, CBC 101 may compare some or all of the information included in the received (at 504) indication, such as the identifier of UE 103, device type of UE 103, etc., to conditions, criteria, etc. specified by one or more core bypass policies.

When identifying that UE 103 is not associated with a core bypass policy (e.g., does not satisfy criteria, conditions, etc. associated with any core bypass policies maintained by CBC 101), CBC 101 may not output instructions (e.g., may forgo outputting instructions) for traffic associated with UE 103 to bypass core network 105. For example, CBC 101 may forgo performing one or more of operations 508-512 discussed below.

On the other hand, when identifying that UE 103 is associated with one or more core bypass policies, process 500 may additionally include identifying (at 508) a core bypass policy associated with the particular UE 103. For example, CBC 101 may identify that some or all of the information included in the received (at 504) indication meets, matches, satisfies, etc. one or more conditions, criteria, etc. specified by one or more core bypass policies.

Process 500 may also include instructing (at 510) RAN 107 to bypass core network 105 when routing traffic associated with the particular UE 103. For example, as discussed above, CBC 101 may instruct, configure, etc. a particular DU 301 to bypass core network 105 when routing traffic associated with UE 103 (e.g., traffic received from UE 103 via an RU). Additionally, or alternatively, CBC 101 may communicate with a RAN controller or other suitable device or system that instructs the particular DU 301 to bypass core network 105 when routing traffic associated with UE 103. In some embodiments, configuring, instructing, etc. DU 301 may include providing a UE identifier associated with UE 103, such as a SUPI, a GUTI, etc.

Additionally, or alternatively, as discussed above, CBC 101 may instruct, configure, etc. one or more routers 203 of RAN 107 (e.g., a particular router 203 to which DU 301 is communicatively coupled) to bypass core network 105 when routing traffic associated with UE 103. Additionally, or alternatively, CBC 101 may communicate with a RAN controller or other suitable device or system that instructs the one or more routers 203 to bypass core network 105 when routing traffic associated with UE 103. In some embodiments, configuring, instructing, etc. such routers 203 may include providing a UE identifier associated with UE 103, such as a SUPI, a GUTI, etc. As discussed above, routers 203 may maintain information associating particular UE identifiers (e.g., SUPI, GUTI, etc.) with routing identifiers (e.g., IP addresses). In some embodiments, routers 203 may include segment routers or other routers for which a routing path may be specified by a sender of the traffic (e.g., as opposed to routing techniques in which each "hop" in a routing path (e.g., where a particular hop may be associated with a particular routing device) selects a next hop). That is, routers 203 may utilize a routing technique in which a particular router 203 may select multiple subsequent hops in the routing path.

Process 500 may further include routing (at 512), by RAN 107, traffic associated with the particular UE 103 without routing such traffic via core network 105. For example, as discussed above, DU 301 may receive traffic from UE 103 (e.g., via an RU), may identify that the traffic is associated with a particular UE identifier indicated (at 510) as being associated with a core bypass policy, and may accordingly route, forward, etc. such traffic to router 203. In some embodiments, DU 301 may route such traffic to router 203 in lieu of to another device or system, such as a CU. In some embodiments, routing the traffic may include providing a UE identifier (e.g., SUPI, GUTI, etc.) to router 203. Based on the UE identifier, router 203 may identify that the traffic should bypass core network 105 (e.g., that UE 103 is associated with a core bypass policy). Router 203 may accordingly select one or more routing paths that avoid core network 105 (e.g., that do not include one or more routing devices associated with core network 105). In some embodiments, router 203 may select one or more routing paths that include one or more routing devices that are included in or are communicatively coupled to DN 109.

In some embodiments, as noted above, certain UEs 103 may not be associated with a core bypass policy. In such scenarios, CBC 101 may instruct one or more RAN elements (e.g., DU 301) to forward traffic associated with such UEs 103 to or via core network 105. Additionally, or alternatively, CBC 101 may forgo providing an instruction to such RAN elements to bypass core network 105. As such, DU 301 may forward traffic, associated with such UEs 103, to core network 105 (e.g., based on receiving the instruction to forward traffic, associated with such UEs 103, to core network 105 and/or based on the absence of an instruction to bypass core network 105 and instead forward such traffic to DN 109).

Figure 6:
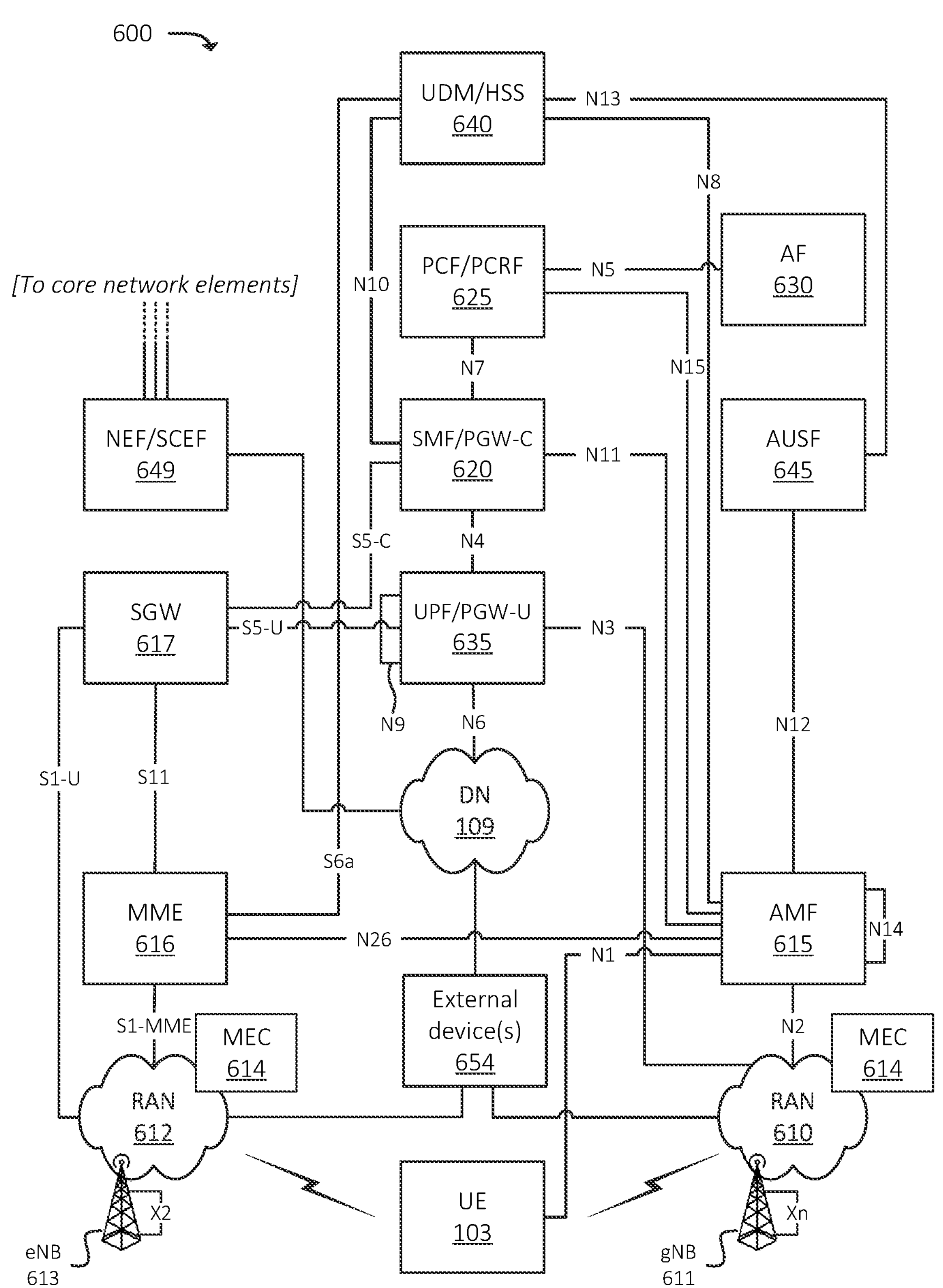
FIGS. 6 and 7 illustrate example environments in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 103, RAN 610 (which may include one or more Next Generation Node Bs ("gNBs") 611), RAN 612 (which may include one or more evolved Node Bs ("eNBs") 613), and various network functions such as AMF 615, MME 616, Serving Gateway ("SGW") 617, Session Management Function ("SMF")/PGW-Control plane function ("PGW-C") 620, PCF/PCRF 625, Application Function ("AF") 630, UPF/PGW-User plane function ("PGW-U") 635, Unified Data Management ("UDM")/Home Subscriber Server ("HSS") 640, Authentication Server Function ("AUSF") 645, and NEF/SCEF 649. Environment 600 may also include one or more networks, such as Data Network ("DN") 109. Environment 600 may include one or more additional devices or systems communicatively coupled to one or more networks (e.g., DN 109), such as one or more external devices 654.

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of AMF 615, SMF/PGW-C 620, PCF/PCRF 625, and/or UPF/PGW-U 635, while another slice may include a second instance of AMF 615, SMF/PGW-C 620, PCF/PCRF 625, and/or UPF/PGW-U 635). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Additionally, one or more elements of environment 600 may be implemented in a virtualized and/or containerized manner. For example, one or more of the elements of environment 600 may be implemented by one or more Virtualized Network Functions ("VNFs"), Cloud-Native Network Functions ("CNFs"), etc. In such embodiments, environment 600 may include, may implement, and/or may be communicatively coupled to an orchestration platform that provisions hardware resources, installs containers or applications, performs load balancing, and/or otherwise manages the deployment of such elements of environment 600. In some embodiments, such orchestration and/or management of such elements of environment 600 may be performed by, or in conjunction with, the open-source Kubernetes® application programming interface ("API") or some other suitable virtualization, containerization, and/or orchestration system.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 600 may be, may include, may be implemented by, and/or may be communicatively coupled to network 1nw.

UE 103 may include a computation and communication device, such as a wireless mobile communication device that is capable of communicating with RAN 610, RAN 612, and/or DN 109. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 103 may send traffic to and/or receive traffic (e.g., user plane traffic) from DN 109 via RAN 610, RAN 612, and/or UPF/PGW-U 635.

RAN 610 may be, or may include, a 5G RAN that implements a 5G RAT and that includes one or more base stations (e.g., one or more gNBs 611), via which UE 103 may communicate with one or more other elements of environment 600. UE 103 may communicate with RAN 610 via an air interface (e.g., as provided by gNB 611). For instance, RAN 610 may receive traffic (e.g., user plane traffic such as voice call traffic, data traffic, messaging traffic, etc.) from UE 103 via the air interface, and may communicate the traffic to UPF/PGW-U 635 and/or one or more other devices or networks. Further, RAN 610 may receive signaling traffic, control plane traffic, etc. from UE 103 via the air interface, and may communicate such signaling traffic, control plane traffic, etc. to AMF 615 and/or one or more other devices or networks. Additionally, RAN 610 may receive traffic intended for UE 103 (e.g., from UPF/PGW-U 635, AMF 615, and/or one or more other devices or networks) and may communicate the traffic to UE 103 via the air interface. In some embodiments, base station 201 may be, may include, and/or may be implemented by one or more gNBs 611. In some embodiments, RAN 107 may be, may include, and/or may be implemented by RAN 610.

RAN 612 may be, or may include, an LTE RAN that implements an LTE RAT and that includes one or more base stations (e.g., one or more eNBs 613), via which UE 103 may communicate with one or more other elements of environment 600. UE 103 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 103 via the air interface, and may communicate the traffic to UPF/PGW-U 635 (e.g., via SGW 617) and/or one or more other devices or networks. Further, RAN 612 may receive signaling traffic, control plane traffic, etc. from UE 103 via the air interface, and may communicate such signaling traffic, control plane traffic, etc. to MME 616 and/or one or more other devices or networks. Additionally, RAN 612 may receive traffic intended for UE 103 (e.g., from UPF/PGW-U 635, MME 616, SGW 617, and/or one or more other devices or networks) and may communicate the traffic to UE 103 via the air interface. In some embodiments, base station 201 may be, may include, and/or may be implemented by one or more eNBs 613. In some embodiments, RAN 107 may be, may include, and/or may be implemented by RAN 612.

One or more RANs of environment 600 (e.g., RAN 610 and/or RAN 612) may include, may implement, and/or may otherwise be communicatively coupled to one or more edge computing devices, such as one or more Multi-Access/Mobile Edge Computing ("MEC") devices (referred to sometimes herein simply as a "MECs") 614. MECs 614 may be co-located with wireless network infrastructure equipment of RANs 610 and/or 612 (e.g., one or more gNBs 611 and/or one or more eNBs 613, respectively). Additionally, or alternatively, MECs 614 may otherwise be associated with geographical regions (e.g., coverage areas) of wireless network infrastructure equipment of RANs 610 and/or 612. In some embodiments, one or more MECs 614 may be implemented by the same set of hardware resources, the same set of devices, etc. that implement wireless network infrastructure equipment of RANs 610 and/or 612. In some embodiments, one or more MECs 614 may be implemented by different hardware resources, a different set of devices, etc. from hardware resources or devices that implement wireless network infrastructure equipment of RANs 610 and/or 612. In some embodiments, MECs 614 may be communicatively coupled to wireless network infrastructure equipment of RANs 610 and/or 612 (e.g., via a high-speed and/or low-latency link such as a physical wired interface, a high-speed and/or low-latency wireless interface, or some other suitable communication pathway).

MECs 614 may include hardware resources (e.g., configurable or provisionable hardware resources) that may be configured to provide services and/or otherwise process traffic to and/or from UE 103, via RAN 610 and/or 612. For example, RAN 610 and/or 612 may route some traffic from UE 103 (e.g., traffic associated with one or more particular services, applications, application types, etc.) to a respective MEC 614 instead of to core network elements of 600 (e.g., UPF/PGW-U 635). MEC 614 may accordingly provide services to UE 103 by processing such traffic, performing one or more computations based on the received traffic, and providing traffic to UE 103 via RAN 610 and/or 612. MEC 614 may include, and/or may implement, some or all of the functionality described above with respect to UPF/PGW-U 635, AF 630, one or more application servers, and/or one or more other devices, systems, VNFs, CNFs, etc. In this manner, ultra-low latency services may be provided to UE 103, as traffic does not need to traverse links (e.g., backhaul links) between RAN 610 and/or 612 and the core network.

AMF 615 may include one or more devices, systems, VNFs, CNFs, etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 103. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 103, from DN 109, and may forward the user plane data toward UE 103 (e.g., via RAN 610, SMF/PGW-C 620, and/or one or more other devices). In some embodiments, multiple instances of UPF/PGW-U 635 may be deployed (e.g., in different geographical locations), and the delivery of content to UE 103 may be coordinated via the N9 interface (e.g., as denoted in FIG. 6 by the line marked "N9" originating and terminating at UPF/PGW-U 635). Similarly, UPF/PGW-U 635 may receive traffic from UE 103 (e.g., via RAN 610, RAN 612, SMF/PGW-C 620, and/or one or more other devices), and may forward the traffic toward DN 109. In some embodiments, UPF/PGW-U 635 may communicate (e.g., via the N4 interface) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. In some embodiments, UDM/HSS 640 may include, may implement, may be communicatively coupled to, and/or may otherwise be associated with some other type of repository or database, such as a Unified Data Repository ("UDR"). AUSF 645 and/or UDM/HSS 640 may perform authentication, authorization, and/or accounting operations associated with one or more UEs 103 and/or one or more communication sessions associated with one or more UEs 103.

DN 109 may include one or more wired and/or wireless networks. For example, DN 109 may include an Internet Protocol ("IP")-based PDN, a wide area network ("WAN") such as the Internet, a private enterprise network, and/or one or more other networks. UE 103 may communicate, through DN 109, with data servers, other UEs 103, and/or to other servers or applications that are coupled to DN 109. DN 109 may be connected to one or more other networks, such as a public switched telephone network ("PSTN"), a public land mobile network ("PLMN"), and/or another network. DN 109 may be connected to one or more devices, such as content providers, applications, web servers, and/or other devices, with which UE 103 may communicate.

External devices 654 may include one or more devices or systems that communicate with UE 103 via DN 109 and one or more elements of 600 (e.g., via UPF/PGW-U 635). In some embodiments, external devices 654 may include, may implement, and/or may otherwise be associated with CBC 101. External devices 654 may include, for example, one or more application servers, content provider systems, web servers, or the like. External devices 654 may, for example, implement "server-side" applications that communicate with "client-side" applications executed by UE 103. External devices 654 may provide services to UE 103 such as gaming services, videoconferencing services, messaging services, email services, web services, and/or other types of services.

In some embodiments, external devices 654 may communicate with one or more elements of environment 600 (e.g., core network elements) via NEF/SCEF 649. NEF/SCEF 649 include one or more devices, systems, VNFs, CNFs, etc. that provide access to information, APIs, and/or other operations or mechanisms of one or more core network elements to devices or systems that are external to the core network (e.g., to external device 654 via DN 109). NEF/SCEF 649 may maintain authorization and/or authentication information associated with such external devices or systems, such that NEF/SCEF 649 is able to provide information, that is authorized to be provided, to the external devices or systems. For example, a given external device 654 may request particular information associated with one or more core network elements. NEF/SCEF 649 may authenticate the request and/or otherwise verify that external device 654 is authorized to receive the information, and may request, obtain, or otherwise receive the information from the one or more core network elements. In some embodiments, NEF/SCEF 649 may include, may implement, may be implemented by, may be communicatively coupled to, and/or may otherwise be associated with a Security Edge Protection Proxy ("SEPP"), which may perform some or all of the functions discussed above. External device 654 may, in some situations, subscribe to particular types of requested information provided by the one or more core network elements, and the one or more core network elements may provide (e.g., "push") the requested information to NEF/SCEF 649 (e.g., in a periodic or otherwise ongoing basis).

In some embodiments, external devices 654 may communicate with one or more elements of RAN 610 and/or 612 via an API or other suitable interface. For example, a given external device 654 may provide instructions, requests, etc. to RAN 610 and/or 612 to provide one or more services via one or more respective MECs 614. In some embodiments, such instructions, requests, etc. may include QoS parameters, Service Level Agreements ("SLAs"), etc. (e.g., maximum latency thresholds, minimum throughput thresholds, etc.) associated with the services.

Figure 7:
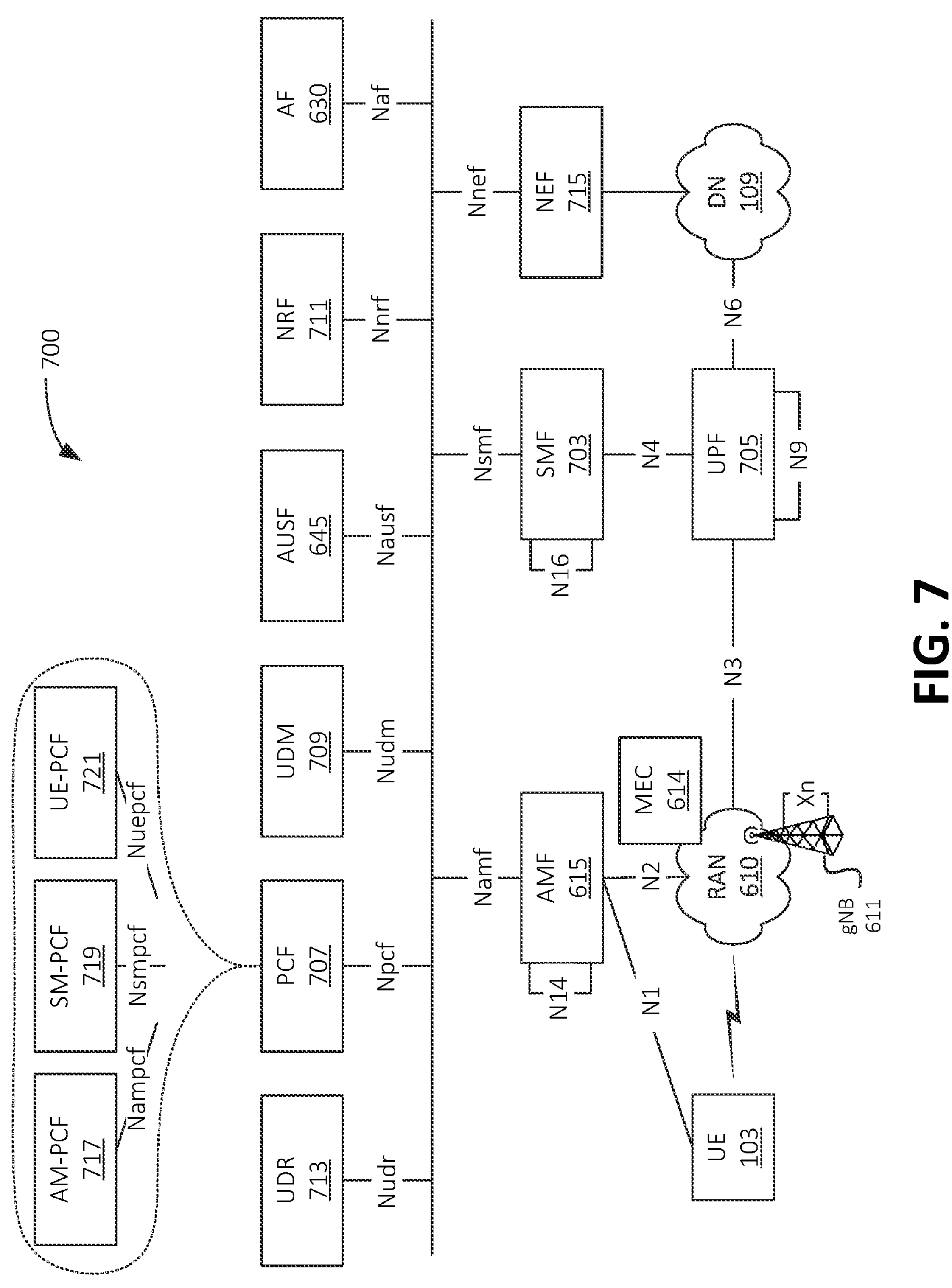

FIG. 7 illustrates another example environment 700, in which one or more embodiments may be implemented. In some embodiments, environment 700 may correspond to a 5G network, and/or may include elements of a 5G network. In some embodiments, environment 700 may correspond to a 5G SA architecture. In some embodiments, environment 700 may include a 5GC, in which 5GC network elements perform one or more operations described herein.

As shown, environment 700 may include UE 103, RAN 610 (which may include one or more gNBs 611 or other types of wireless network infrastructure) and various network functions, which may be implemented as VNFs, CNFs, etc. Such network functions may include AMF 615, SMF 703, UPF 705, PCF 707, UDM 709, AUSF 645, Network Repository Function ("NRF") 711, AF 630, UDR 713, and NEF 715. Environment 700 may also include or may be communicatively coupled to one or more networks, such as DN 109.

The example shown in FIG. 7 illustrates one instance of each network component or function (e.g., one instance of SMF 703, UPF 705, PCF 707, UDM 709, AUSF 645, etc.). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF 703, PCF 707, UPF 705, etc., while another slice may include a second instance of SMF 703, PCF 707, UPF 705, etc.). Additionally, or alternatively, one or more of the network functions of environment 700 may implement multiple network slices. The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include interfaces shown in FIG. 7 and/or one or more interfaces not explicitly shown in FIG. 7. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 700 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 615), an Nudm interface (e.g., indicating communications to be routed to UDM 709), an Npcf interface, an Nupf interface, an Nnef interface, an Nsmf interface, an Nnrf interface, an Nudr interface, an Naf interface, and/or one or more other SBIs. In some embodiments, environment 700 may be, may include, may be implemented by, and/or may be communicatively coupled to RAN 107 and/or core network 105.

UPF 705 may include one or more devices, systems, VNFs, CNFs, etc., that receive, route, process, and/or forward traffic (e.g., user plane traffic). As discussed above, UPF 705 may communicate with UE 103 via one or more communication sessions, such as PDU sessions. Such PDU sessions may be associated with a particular network slice or other suitable QoS parameters, as noted above. UPF 705 may receive downlink user plane traffic (e.g., voice call traffic, data traffic, etc. destined for UE 103) from DN 109, and may forward the downlink user plane traffic toward UE 103 (e.g., via RAN 610). In some embodiments, multiple UPFs 705 may be deployed (e.g., in different geographical locations), and the delivery of content to UE 103 may be coordinated via the N9 interface. Similarly, UPF 705 may receive uplink traffic from UE 103 (e.g., via RAN 610), and may forward the traffic toward DN 109. In some embodiments, UPF 705 may implement, may be implemented by, may be communicatively coupled to, and/or may otherwise be associated with UPF/PGW-U 635. In some embodiments, UPF 705 may communicate (e.g., via the N4 interface) with SMF 703, regarding user plane data processed by UPF 705 (e.g., to provide analytics or reporting information, to receive policy and/or authorization information, etc.).

PCF 707 may include one or more devices, systems, VNFs, CNFs, etc., that aggregate, derive, generate, etc. policy information associated with the 5GC and/or UEs 103 that communicate via the 5GC and/or RAN 610. PCF 707 may receive information regarding policies and/or subscriptions from one or more sources, such as subscriber databases (e.g., UDM 709, UDR 713, etc.), and/or from one or more users such as, for example, an administrator associated with PCF 707. In some embodiments, the functionality of PCF 707 may be split into multiple network functions or subsystems, such as access and mobility PCF ("AM-PCF") 717, session management PCF ("SM-PCF") 719, UE PCF ("UE-PCF") 721, and so on. Such different "split" PCFs may be associated with respective SBIs (e.g., AM-PCF 717 may be associated with an Nampcf SBI, SM-PCF 719 may be associated with an Nsmpcf SBI, UE-PCF 721 may be associated with an Nuepcf SBI, and so on) via which other network functions may communicate with the split PCFs. The split PCFs may maintain information regarding policies associated with different devices, systems, and/or network functions.

NRF 711 may include one or more devices, systems, VNFs, CNFs, etc. that maintain routing and/or network topology information associated with the 5GC. For example, NRF 711 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 713 may include one or more devices, systems, VNFs, CNFs, etc. that provide user and/or subscriber information, based on which PCF 707 and/or other elements of environment 700 may determine access policies, QoS policies, charging policies, or the like. In some embodiments, UDR 713 may receive such information from UDM 709 and/or one or more other sources.

NEF 715 include one or more devices, systems, VNFs, CNFs, etc. that provide access to information, APIs, and/or other operations or mechanisms of the 5GC to devices or systems that are external to the 5GC. NEF 715 may maintain authorization and/or authentication information associated with such external devices or systems, such that NEF 715 is able to provide information, that is authorized to be provided, to the external devices or systems. Such information may be received from other network functions of the 5GC (e.g., as authorized by an administrator or other suitable entity associated with the 5GC), such as SMF 703, UPF 705, a charging function ("CHF") of the 5GC, and/or other suitable network function. NEF 715 may communicate with external devices or systems (e.g., external devices 654) via DN 109 and/or other suitable communication pathways.

While environment 700 is described in the context of a 5GC, as noted above, environment 700 may, in some embodiments, include or implement one or more other types of core networks. For example, in some embodiments, environment 700 may be or may include a converged packet core, in which one or more elements may perform some or all of the functionality of one or more 5GC network functions and/or one or more EPC network functions. For example, in some embodiments, AMF 615 may include, may implement, may be implemented by, and/or may otherwise be associated with MME 616; SMF 703 may include, may implement, may be implemented by, and/or may otherwise be associated with SGW 617; PCF 707 may include, may implement, may be implemented by, and/or may otherwise be associated with a PCRF (e.g., PCF/PCRF 625); NEF 715 may include, may implement, may be implemented by, and/or may otherwise be associated with a SCEF (e.g., NEF/SCEF 649); and so on.

Figure 8:
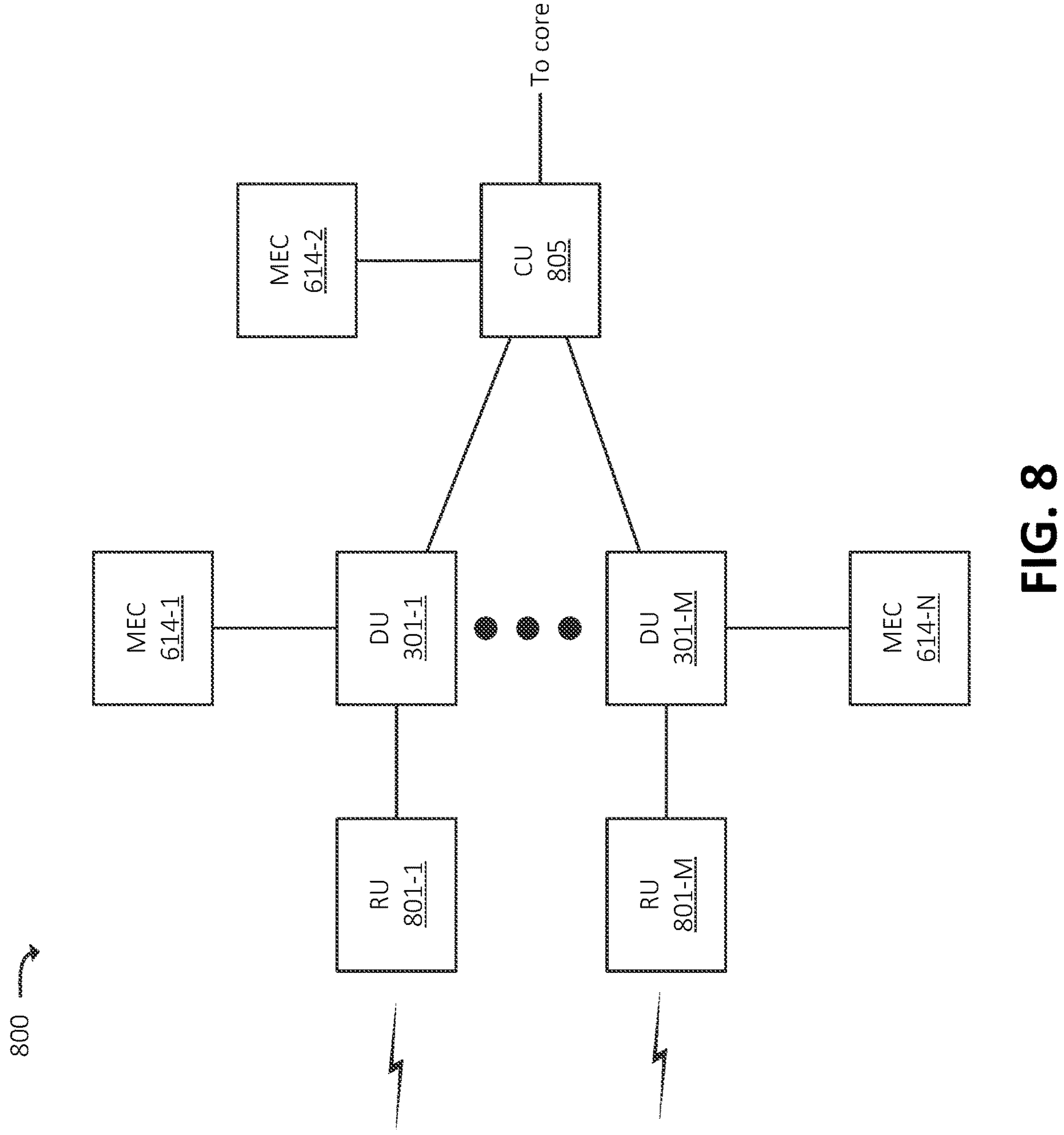
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 610 or some other RAN). In some embodiments, a particular RAN 610 may include one RAN environment 800. In some embodiments, a particular RAN 610 may include multiple RAN environments 800. In some embodiments, RAN environment 800 may correspond to a particular gNB 611 of RAN 610. In some embodiments, RAN environment 800 may correspond to multiple gNBs 611. In some embodiments, RAN environment 800 may correspond to one or more other types of base stations of one or more other types of RANs. As shown, RAN environment 800 may include CU 805, one or more Distributed Units ("DUs") 301-1 through 301-M (referred to individually as "DU 301," or collectively as "DUs 301"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 615 and/or UPF 705) and/or some other device or system such as MEC 614. In the uplink direction (e.g., for traffic from UEs 103 to a core network), CU 805 may aggregate traffic from DUs 301, and forward the aggregated traffic to the core network. In some embodiments, CU 805 may receive traffic according to a given protocol (e.g., Radio Link Control ("RLC") traffic) from DUs 301, and may perform higher-layer processing (e.g., may aggregate/process RLC packets and generate Packet Data Convergence Protocol ("PDCP") packets based on the RLC packets) on the traffic received from DUs 301.

CU 805 may receive downlink traffic (e.g., traffic from the core network, traffic from a given MEC 614, etc.) for a particular UE 103, and may determine which DU(s) 301 should receive the downlink traffic. DU 301 may include one or more devices that transmit traffic between a core network (e.g., via CU 805) and UE 103 (e.g., via a respective RU 801). DU 301 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 301 may receive traffic from CU 805 at the second layer, may process the traffic to the first layer, and provide the processed traffic to a respective RU 801 for transmission to UE 103.

RU 801 may include hardware circuitry (e.g., one or more RF transceivers, antennas, radios, and/or other suitable hardware) to communicate wirelessly (e.g., via an RF interface) with one or more UEs 103, one or more other DUs 301 (e.g., via RUs 801 associated with DUs 301), and/or any other suitable type of device. In the uplink direction, RU 801 may receive traffic from UE 103 and/or another DU 301 via the RF interface and may provide the traffic to DU 301. In the downlink direction, RU 801 may receive traffic from DU 301, and may provide the traffic to UE 103 and/or another DU 301.

One or more elements of RAN environment 800 may, in some embodiments, be communicatively coupled to one or more MECs 614. For example, DU 301-1 may be communicatively coupled to MEC 614-1, DU 301-M may be communicatively coupled to MEC 614-N, CU 805 may be communicatively coupled to MEC 614-2, and so on. MECs 614 may include hardware resources (e.g., configurable or provisionable hardware resources) that may be configured to provide services and/or otherwise process traffic to and/or from UE 103, via a respective RU 801.

For example, DU 301-1 may route some traffic, from UE 103, to MEC 614-1 instead of to a core network via CU 805. MEC 614-1 may process the traffic, perform one or more computations based on the received traffic, and may provide traffic to UE 103 via RU 801-1. As discussed above, MEC 614 may include, and/or may implement, some or all of the functionality described above with respect to UPF 705, AF 630, and/or one or more other devices, systems, VNFs, CNFs, etc. In this manner, ultra-low latency services may be provided to UE 103, as traffic does not need to traverse DU 301, CU 805, links between DU 301 and CU 805, and an intervening backhaul network between RAN environment 800 and the core network.

Figure 9:
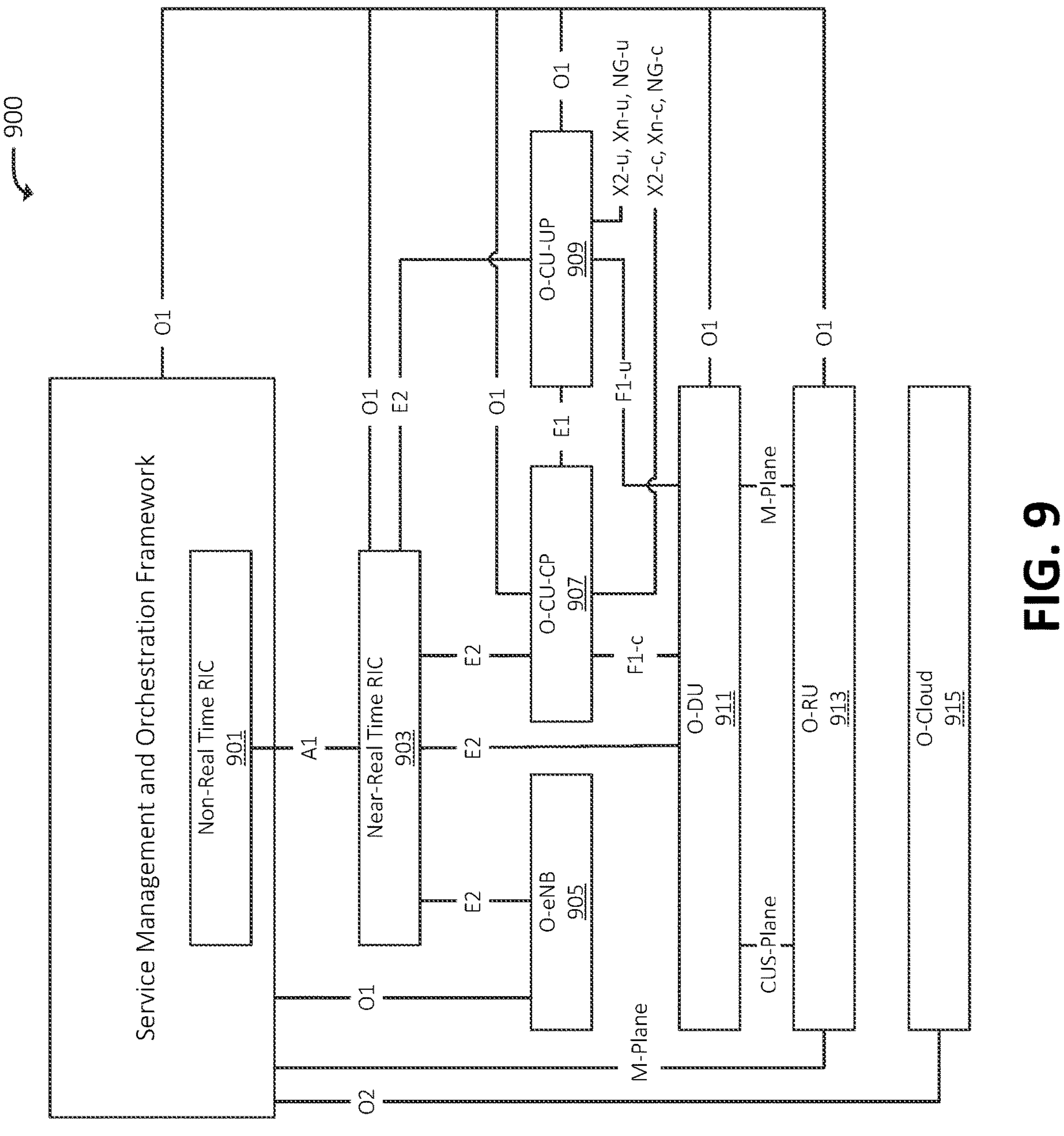
FIG. 9 illustrates an example arrangement of an Open RAN ("O-RAN") environment in which one or more embodiments, described herein, may be implemented.

FIG. 9 illustrates an example O-RAN environment 900, which may correspond to RAN 610, RAN 612, and/or RAN environment 800. For example, RAN 610, RAN 612, and/or RAN environment 800 may include one or more instances of O-RAN environment 900, and/or one or more instances of O-RAN environment 900 may implement RAN 610, RAN 612, RAN environment 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components or interfaces.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 614.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation. In some embodiments, Non-Real Time RIC 901 and/or Near-Real Time RIC 903 may perform one or more of the operations described above with respect to CBC 101 (e.g., generating, maintaining, and/or outputting core bypass policies).

O-eNB 905 may perform functions similar to those described above with respect to base station 201, gNB 611, and/or eNB 613. For example, O-eNB 905 may facilitate wireless communications between UE 103 and a core network. O-CU-CP 907 may perform control plane signaling to coordinate the aggregation and/or distribution of traffic via one or more DUs 301, which may include and/or be implemented by one or more O-DUs 911, and O-CU-UP 909 may perform the aggregation and/or distribution of traffic via such DUs 301 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 614, which may provide services, and may be communicatively coupled, to O-CU-CP 907, O-CU-UP 909, O-DU 911, and/or O-RU 913 (e.g., via an O1 and/or O2 interface).

Figure 10:
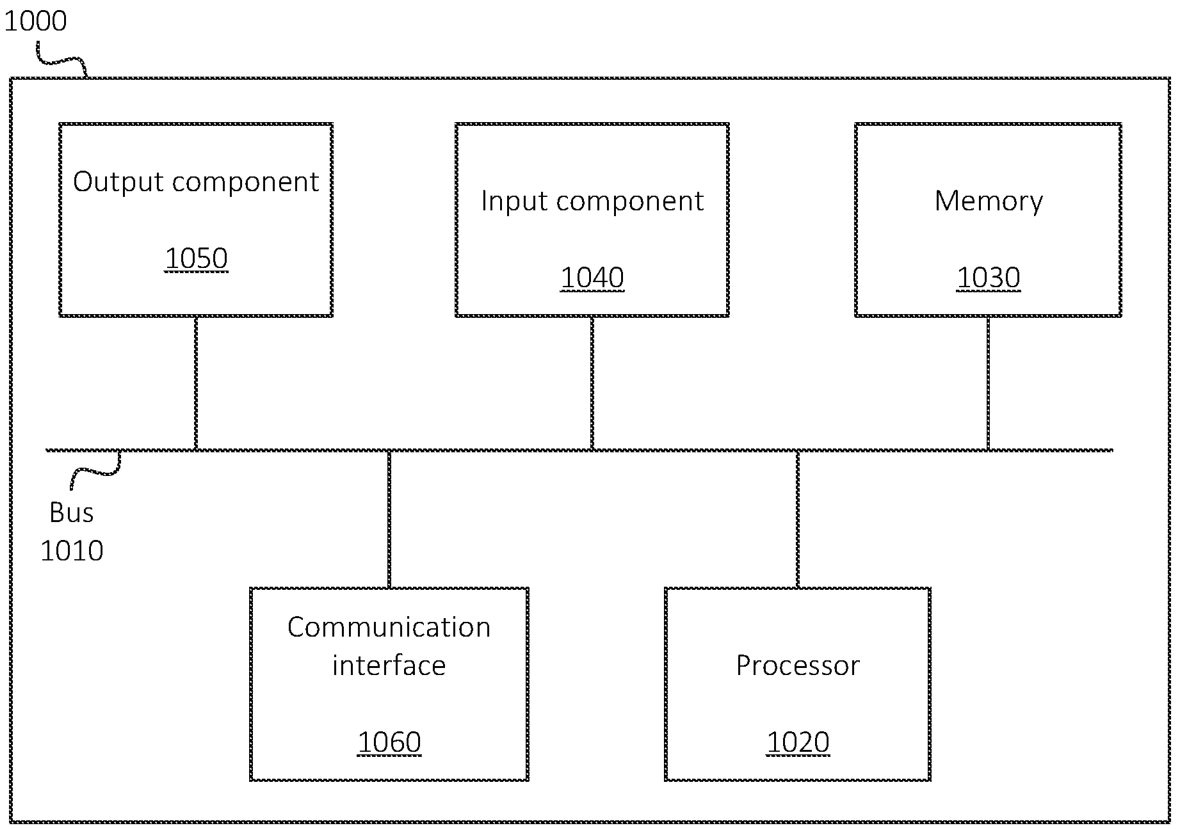
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN 610, RAN 612, DN 109, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information. No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

receive an indication that a particular User Equipment ("UE") has wirelessly connected to a radio access network ("RAN") of a wireless network, wherein the RAN is communicatively coupled to a core network of the wireless network, wherein the RAN and the core network are communicatively coupled to a Data Network ("DN");

identify particular UE attribute information associated with the particular UE, wherein the particular UE attribute information includes historical location information associated with the particular UE;

determine, based on the historical location information, that the particular UE has remained within a coverage area of a particular base station of the RAN for at least a threshold duration of time;

identify, based on determining that the particular UE has remained within the coverage area of the particular base station for at least the threshold duration of time, that the particular UE is associated with a particular core bypass policy; and instruct, based on identifying that the particular UE is associated with the particular core bypass policy, the RAN to bypass the core network when routing traffic associated with the particular UE, wherein based on the instruction to bypass the core network, the RAN routes traffic, received from the particular UE, to the DN without routing the traffic to the core network.

2. The device of claim 1, wherein the particular UE is a first UE, wherein the RAN routes traffic, received from a second UE, to the core network based on at least one of:

not receiving an instruction to bypass the core network for traffic associated with the second UE, or receiving an instruction to route traffic, associated with the second UE, to the core network.

3. The device of claim 1, wherein the indication includes a Subscription Permanent Identifier ("SUPI") of the particular UE, wherein instructing the RAN to bypass the core network includes providing the SUPI of the particular UE to the RAN, wherein the RAN identifies the traffic associated with the particular UE based on the SUPI of the UE being included in the traffic.

4. The device of claim 1, wherein instructing the RAN to bypass the core network includes instructing a router associated with the RAN to route traffic, associated with the particular UE, via a routing path that does not include the core network.

5. The device of claim 1, wherein instructing the RAN to bypass the core network includes instructing a Distributed Unit ("DU") of the RAN to forward the traffic to a router that is communicatively coupled to the DN.

6. The device of claim 5, wherein based on the instruction to forward the traffic to the router, the DU forgoes forwarding the traffic to a Central Unit ("CU") that is communicatively coupled to the core network.

7. The device of claim 1, wherein the indication is received from at least one of:

a base station of the RAN to which the UE has wirelessly connected, an Access and Mobility Management Function ("AMF") that is communicatively coupled to the base station, or a Mobility Management Entity ("MME") that is communicatively coupled to the base station.

8. A non-transitory computer-readable medium, storing a plurality of processor-executable instructions to:

receive an indication that a particular User Equipment ("UE") has wirelessly connected to a radio access network ("RAN") of a wireless network, wherein the RAN is communicatively coupled to a core network of the wireless network, wherein the RAN and the core network are communicatively coupled to a Data Network ("DN");

identify particular UE attribute information associated with the particular UE, wherein the particular UE attribute information includes historical location information associated with the particular UE;

determine, based on the historical location information, that the particular UE has remained within a coverage area of a particular base station of the RAN for at least a threshold duration of time;

identify, based on determining that the particular UE has remained within the coverage area of the particular base station for at least the threshold duration of time, that the particular UE is associated with a particular core bypass policy; and instruct, based on identifying that the particular UE is associated with the particular core bypass policy, the RAN to bypass the core network when routing traffic associated with the particular UE, wherein based on the instruction to bypass the core network, the RAN routes traffic, received from the particular UE, to the DN without routing the traffic to the core network.

9. The non-transitory computer-readable medium of claim 8, wherein the particular UE is a first UE, wherein the RAN routes traffic, received from a second UE, to the core network based on at least one of:

not receiving an instruction to bypass the core network for traffic associated with the second UE, or receiving an instruction to route traffic, associated with the second UE, to the core network.

10. The non-transitory computer-readable medium of claim 8, wherein the indication includes a Subscription Permanent Identifier ("SUPI") of the particular UE, wherein instructing the RAN to bypass the core network includes providing the SUPI of the particular UE to the RAN, wherein the RAN identifies the traffic associated with the particular UE based on the SUPI of the UE being included in the traffic.

11. The non-transitory computer-readable medium of claim 8, wherein instructing the RAN to bypass the core network includes instructing a router associated with the RAN to route traffic, associated with the particular UE, via a routing path that does not include the core network.

12. The non-transitory computer-readable medium of claim 8, wherein instructing the RAN to bypass the core network includes instructing a Distributed Unit ("DU") of the RAN to forward the traffic to a router that is communicatively coupled to the DN.

13. The non-transitory computer-readable medium of claim 12, wherein based on the instruction to forward the traffic to the router, the DU forgoes forwarding the traffic to a Central Unit ("CU") that is communicatively coupled to the core network.

14. The non-transitory computer-readable medium of claim 8, wherein the indication is received from at least one of:

a base station of the RAN to which the UE has wirelessly connected, an Access and Mobility Management Function ("AMF") that is communicatively coupled to the base station, or a Mobility Management Entity ("MME") that is communicatively coupled to the base station.

15. A method, comprising:

receiving an indication that a particular User Equipment ("UE") has wirelessly connected to a radio access network ("RAN") of a wireless network, wherein the RAN is communicatively coupled to a core network of the wireless network, wherein the RAN and the core network are communicatively coupled to a Data Network ("DN");

identifying particular UE attribute information associated with the particular UE, wherein the particular UE attribute information includes historical location information associated with the particular UE;

determining, based on the historical location information, that the particular UE has remained within a coverage area of a particular base station of the RAN for at least a threshold duration of time;

identifying, based on determining that the particular UE has remained within the coverage area of the particular base station for at least the threshold duration of time, that the particular UE is associated with a particular core bypass policy; and instructing, based on identifying that the particular UE is associated with the particular core bypass policy, the RAN to bypass the core network when routing traffic associated with the particular UE, wherein based on the instruction to bypass the core network, the RAN routes traffic, received from the particular UE, to the DN without routing the traffic to the core network.

16. The method of claim 15, wherein the particular UE is a first UE, wherein the RAN routes traffic, received from a second UE, to the core network based on at least one of:

not receiving an instruction to bypass the core network for traffic associated with the second UE, or receiving an instruction to route traffic, associated with the second UE, to the core network.

17. The method of claim 15, wherein the indication includes a Subscription Permanent Identifier ("SUPI") of the particular UE, wherein instructing the RAN to bypass the core network includes providing the SUPI of the particular UE to the RAN, wherein the RAN identifies the traffic associated with the particular UE based on the SUPI of the UE being included in the traffic.

18. The method of claim 15, wherein instructing the RAN to bypass the core network includes instructing a router associated with the RAN to route traffic, associated with the particular UE, via a routing path that does not include the core network.

19. The method of claim 15, wherein instructing the RAN to bypass the core network includes instructing a Distributed Unit ("DU") of the RAN to forward the traffic to a router that is communicatively coupled to the DN, wherein based on the instruction to forward the traffic to the router, the DU forgoes forwarding the traffic to a Central Unit ("CU") that is communicatively coupled to the core network.

20. The method of claim 15, wherein the indication is received from at least one of:

a base station of the RAN to which the UE has wirelessly connected, an Access and Mobility Management Function ("AMF") that is communicatively coupled to the base station, or a Mobility Management Entity ("MME") that is communicatively coupled to the base station.

* * * * *